(12) United States Patent
Kwak et al.

(10) Patent No.: US 9,634,750 B2
(45) Date of Patent: Apr. 25, 2017

(54) BEAMFORMING METHOD AND APPARATUS FOR SERVING MULTIPLE USERS

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Se-Min Kwak, Seoul (KR); Yong-Hoon Kim, Suwon-si (KR); Hee-Seong Yang, Seoul (KR); Sang-Hyouk Choi, Chungju-si (KR); Joo-Hwan Chun, Daejeon (KR)

(73) Assignees: Samsung Electronics Co., Ltd., Suwon-si (KR); Korea Advanced Insitute Of Science and Technology, Daejeon (KR)

( * ) Notice: Subject to any disclaimer, the term of this patent is extended or adjusted under 35 U.S.C. 154(b) by 223 days.

(21) Appl. No.: 14/671,105

(22) Filed: Mar. 27, 2015

(65) Prior Publication Data
US 2015/0282001 A1    Oct. 1, 2015

(30) Foreign Application Priority Data

Mar. 27, 2014    (KR) .................. 10-2014-0036033

(51) Int. Cl.
*H04W 28/02*    (2009.01)
*H04B 7/06*    (2006.01)

(52) U.S. Cl.
CPC ......... *H04B 7/0617* (2013.01); *H04B 7/0695* (2013.01)

(58) Field of Classification Search
CPC .................. H04W 28/0268; H04B 7/0617
See application file for complete search history.

(56) References Cited

U.S. PATENT DOCUMENTS 6,061,023 A * 5/2000 Daniel .................. G01S 7/2813
342/354
6,075,484 A * 6/2000 Daniel ...................... G01S 3/06
342/372

(Continued)

FOREIGN PATENT DOCUMENTS

KR    10-2008-0074419 A    8/2008

*Primary Examiner* — Parth Patel
(74) *Attorney, Agent, or Firm* — Jefferson IP Law, LLP

(57) ABSTRACT

A beamforming method is provided. The beamforming method includes determining different beams for pieces of user equipment based on channel information fed back from the pieces of user equipment, predicting beam qualities of the pieces of user equipment for the beams, determining whether the beam qualities satisfy Quality of Service (QoS) for the pieces of user equipment, generating a wide nulling beam by applying wide nulling to a second beam having a side lobe acting as interference against one first beam, when the beam quality of the first beam does not satisfy the QoS; predicting beam qualities for the beams including the wide nulling beam instead of the second beam, and simultaneously communicating with the user equipment through the beams including the wide nulling beam instead of the second beam, when the beam qualities for the beams including the wide nulling beam instead of the second beam satisfy the QoS.

15 Claims, 15 Drawing Sheets

(56) References Cited

U.S. PATENT DOCUMENTS

| | | | | |
|---|---|---|---|---|
| 6,449,593 B1* | 9/2002 | Valve | G01V 1/001 | 704/233 |
| 2004/0235529 A1* | 11/2004 | Tarokh | H01Q 1/246 | 455/562.1 |
| 2007/0249402 A1* | 10/2007 | Dong | H04B 7/0408 | 455/562.1 |
| 2008/0069058 A1* | 3/2008 | Geng | H04B 7/022 | 370/336 |
| 2009/0196203 A1* | 8/2009 | Taira | H04B 7/0617 | 370/280 |
| 2010/0085917 A1* | 4/2010 | Gorokhov | H04L 5/0023 | 370/328 |
| 2011/0065448 A1* | 3/2011 | Song | H04B 7/0632 | 455/452.2 |
| 2011/0164668 A1* | 7/2011 | Hoek | H04B 7/0619 | 375/224 |
| 2012/0063348 A1* | 3/2012 | Guo | H04B 7/0617 | 370/252 |
| 2013/0034241 A1* | 2/2013 | Pandey | H04R 3/005 | 381/92 |
| 2013/0301454 A1* | 11/2013 | Seol | H04B 7/043 | 370/252 |
| 2013/0343303 A1* | 12/2013 | Kim | H04B 7/0452 | 370/329 |
| 2014/0146863 A1* | 5/2014 | Seol | H04B 7/0456 | 375/224 |
| 2014/0334566 A1* | 11/2014 | Kim | H04B 7/0469 | 375/267 |
| 2015/0003325 A1* | 1/2015 | Sajadieh | H04B 7/0452 | 370/328 |
| 2015/0236772 A1* | 8/2015 | Hammarwall | H04B 7/0617 | 370/329 |
| 2015/0282122 A1* | 10/2015 | Kim | H04L 25/03898 | 370/329 |
| 2016/0072568 A1* | 3/2016 | Mun | H04L 1/0026 | 375/267 |
| 2016/0183232 A1* | 6/2016 | Stirling-Gallacher | H04W 72/1226 | 370/280 |
| 2016/0241322 A1* | 8/2016 | Son | H04B 7/0617 | |
| 2016/0359596 A1* | 12/2016 | Wild | H04L 5/0023 | |
| 2016/0360463 A1* | 12/2016 | Kim | H04W 36/30 | |

\* cited by examiner

BEAMFORMING METHOD AND APPARATUS FOR SERVING MULTIPLE USERS

CROSS-REFERENCE TO RELATED APPLICATION(S)

This application claims the benefit under 35 U.S.C. §119(a) of a Korean patent application filed on Mar. 27, 2014 in the Korean Intellectual Property Office and assigned Serial number 10-2014-0036033, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD., and 2) KOREA ADVANCED INSTITUTE OF SCIENCE AND TECHNOLOGY.

TECHNICAL FIELD

The present disclosure relates to a method and apparatus for servicing multiple users through a plurality of beams in a wireless communication system.

BACKGROUND

With the remarkable development of wireless communication technologies, user demands are ever increasing. As users demand higher-capacity and higher-quality data transmission/reception, technologies using multiple antennas are being focused on. Beamforming technology refers to multiplying a response value of each antenna by a particular complex gain in order to obtain a large gain in a particular direction or channel using multiple antennas. The gain generated through such beamforming technology is referred to as a beam, and forming multiple beams in a plurality of directions or with a plurality of channels in one piece of user equipment or in one base station is called a multiple beam technology.

In order to serve multiple users using multiple beams, one base station transmits a signal corresponding to each user through one beam. At this time, each user receives both a signal through a desired beam and a signal through an undesired beam (interference). A technique of minimizing a gain in a direction corresponding to interference in order to reduce an interference signal is referred to as nulling. Since a user typically feeds back only the beam index (ID) having a high received-power level, a base station has difficulty in accurately identifying the location of the user. Accordingly, a point nulling technique for nulling a particular position is not practical in removing interference of beam communication. Furthermore, when the point nulling technique is used to simultaneously serve multiple users without removing interference, communication performance is significantly degraded. The convention technologies consider interference between neighboring cells but not intra-cell interference in simultaneously serving multiple users.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for selecting a beam in consideration of removing inter-cell interference in a wireless communication system using beamforming.

Another aspect of the present disclosure is to provide a method and apparatus for simultaneously servicing multiple users through beamforming in consideration of intra-cell interference.

Another aspect of the present disclosure is to provide a method and apparatus for reducing intra-cell interference in order to simultaneously service multiple users.

Another aspect of the present disclosure is to provide a method and apparatus in which side lobe beam power of an allocated beam minimizes interference generated to other users.

In accordance with an aspect of the present disclosure, a beamforming method for serving multiple users is provided. The beamforming method includes determining, by a beamforming apparatus, different beams for a plurality of pieces of user equipment based on channel information fed back from the plurality of pieces of user equipment, predicting beam qualities of the determined beams of the plurality of pieces of user equipment for the beams, determining whether the beam qualities satisfy a Quality of Service (QoS) for the plurality of pieces of user equipment, applying wide nulling to a second beam having a side lobe acting as interference against at least one first beam of the beams, when the beam quality of the first beam does not satisfy the QoS, predicting beam qualities for the beams including the wide nulling beam instead of the second beam, and simultaneously communicating with the plurality of pieces of user equipment through the beams including the wide nulling beam instead of the second beam, when the beam qualities for the beams including the wide nulling beam instead of the second beam satisfy the QoS.

In accordance with another aspect of the present disclosure, a beamforming apparatus for serving multiple users is provided. The beamforming apparatus includes a beamforming unit and a controller configured to control the beamforming unit, wherein the controller is further configured to determine different beams for a plurality of pieces of user equipment based on channel information fed back from the plurality of pieces of user equipment, to predict beam qualities of the determined beams of the plurality of pieces of user equipment for the beams, to determine whether the beam qualities satisfy a Quality of Service (QoS) for the plurality of pieces of user equipment, to apply wide nulling to a second beam having a side lobe acting as interference against at least one first beam of the beams, when the beam quality of the first beam does not satisfy the QoS, to predict beam qualities for the beams including the wide nulling beam instead of the second beam, and to simultaneously communicate with the plurality of pieces of user equipment through the beams including the wide nulling beam instead of the second beam, when the beam qualities for the beams including the wide nulling beam instead of the second beam satisfy the QoS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 17, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1A:
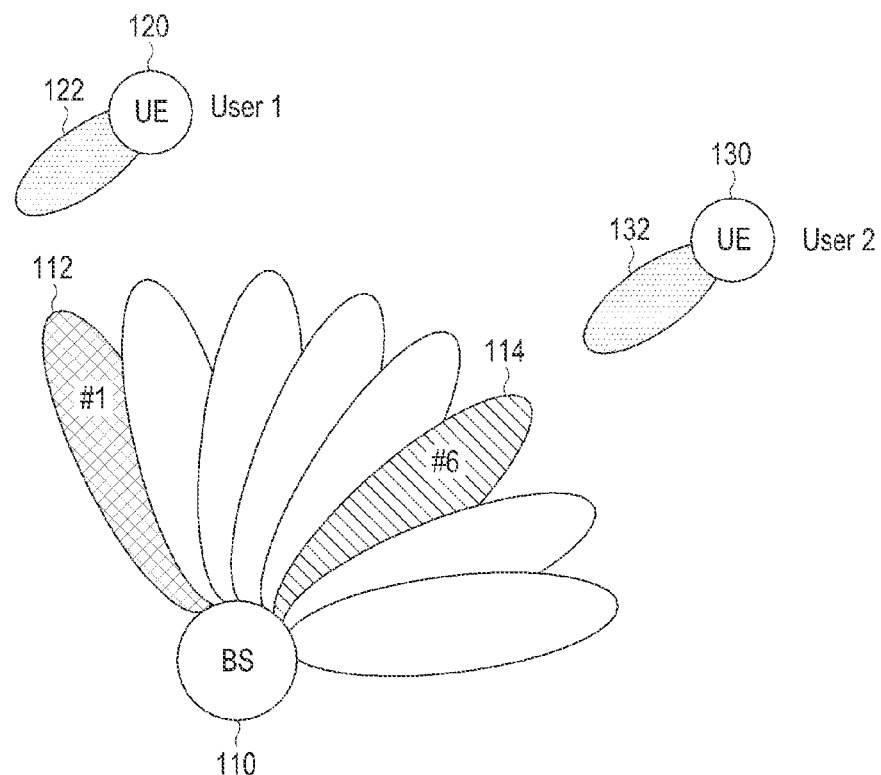
FIGS. 1A and 1B illustrate examples of a beamforming communication system according to various embodiments of the present disclosure.
Figure 1B:
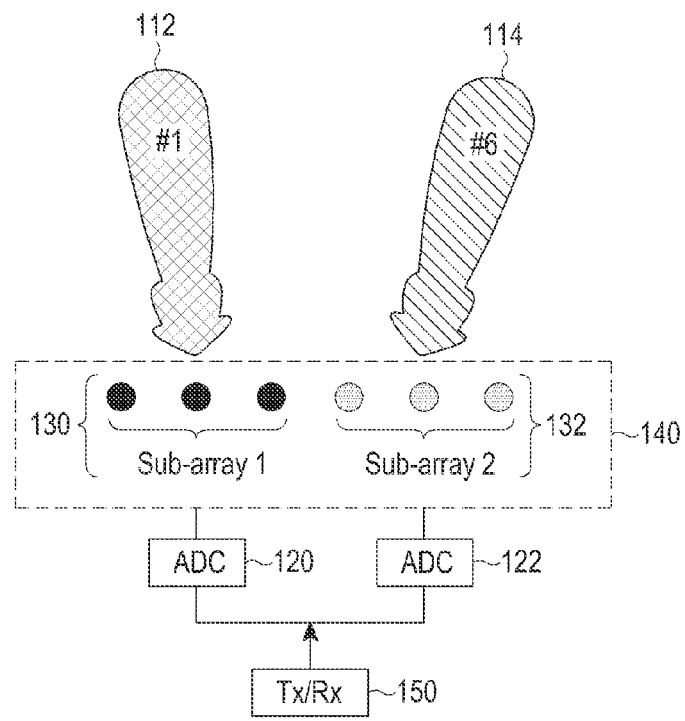

FIGS. 1A and 1B illustrate examples of a beamforming communication system according to various embodiments of the present disclosure.

Referring to FIG. 1A, a base station (BS) 110 and User Equipment (UE) 120 and 130 are illustrated, such that the base station 110 may service the UE 120 and 130 within a cell using a transmission antenna configured with an array antenna.

The base station 110 adjusts gains for respective directions (or channels) of the transmission antenna to form at least one desired beam for the user equipment 120 and 130. Referring to FIG. 1A, user 1 (120) may be allocated beam #1 (112) of the base station 110 and form a beam 122 orienting toward the base station 110. That is, even though user equipment 1 (120) is not present along a line of sight from the base station 110 due to an obstacle, the base station 110 may provide a service with required Quality of Service (QoS) class to user 1 (120) through beamforming. Similarly, user 2 (130) may be allocated beam #6 (114) of the base station 110 and form a beam 132 orienting toward the base station 110. The base station 110 communicates with user 2 (130) using beams 114 and 132.

Although not illustrated, a base station-user equipment beam pair for a downlink from the base station 110 to the user equipment 120 and 130 and a user equipment-base station beam pair for an uplink from the user equipment 120 and 130 to the base station 110 may be configured and formed to be independent of each other.

Referring to FIG. 1B, an array antenna 140 of the base station 110 of FIG. 1A is illustrated. Specifically, as illustrated in FIG. 1B, the base station 110 includes one or more Analog to Digital Converters (ADCs) 120 and 122 connected to a transceiver 150 and the array antenna 140 connected to the ADCs 120 and 122. The array antenna 140 is configured with one or more sub-arrays 130 and 132 connected to the respective ADCs 120 and 122, and antenna elements of each sub-array 130 or 132 are controlled to form a beam 112 (e.g., beam #1) and/or a beam 114 (e.g., beam #6) with a particular gain in a particular direction.

Figure 2:
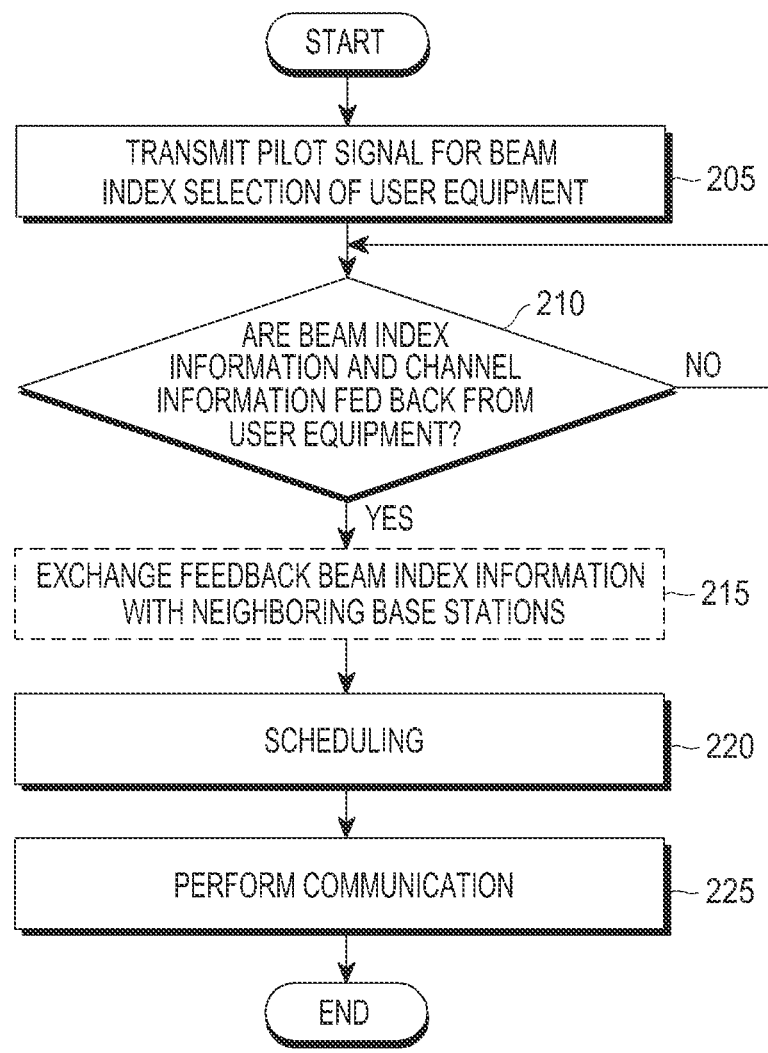
FIG. 2 is a flowchart illustrating a beam selection procedure of a base station for user equipment according to an embodiment of the present disclosure.

FIG. 2 is a flowchart illustrating a beam selection procedure of a base station for user equipment according to an embodiment of the present disclosure.

Referring to FIG. 2, a flowchart is illustrated, such that in operation 205, a base station transmits a prescribed signal, such as a pilot signal, a preamble signal, and/or a beacon signal, to enable user equipment within a cell to select the best beam index of the base station.

In operation 210, the base station identifies whether feedback containing information on at least one selected beam index and channel information is received from any user equipment. The feedback may include at least one beam index selected by the corresponding user equipment, for example, at least one of information to indicate at least one base station transmission beam having the maximum received power, information to indicate a user equipment reception beam corresponding to the selected base station transmission beam, and channel quality information for each base station-user equipment beam pair. If the beam index information and the channel information are not fed back from the user equipment, then operation 210 continues to be executed. However, if the beam index information and the channel information are fed back from the user equipment, then operation 215 is selectively executed.

In operation 215, which is selectively executable, the base station may provide, to neighbor base stations, the beam index information received through the feedback and receive, from the neighbor base stations, information on the beam index received by the corresponding base stations.

In operation 220, the base station performs scheduling based on the beam index information and the channel information to select at least one piece of user equipment that will perform transmission/reception in units of a particular transmission time (e.g., time slot) and to determine transmission/reception resources for the user equipment, namely, a transmission/reception beam and a resource block.

In operation 225, the base station transmits a downlink signal to the user equipment scheduled according to the scheduling result or receives an uplink signal therefrom.

Figure 3A:
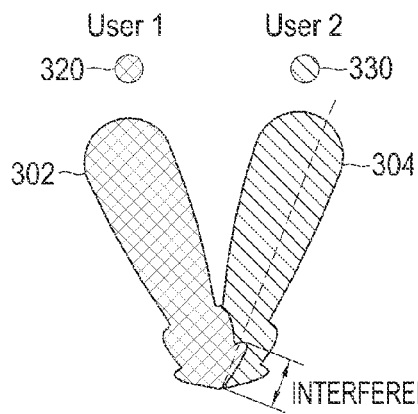
FIGS. 3A and 3B are diagrams illustrating intra-cell interference and interference nulling according to a use of multiple beams according to various embodiments of the present disclosure.
Figure 3B:
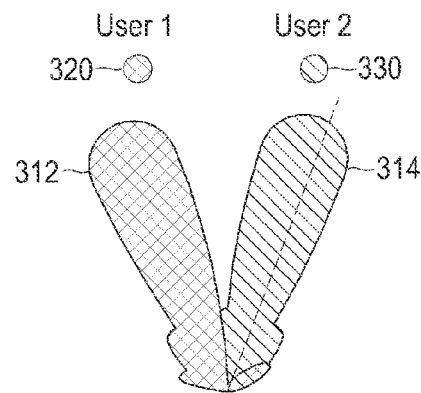

FIGS. 3A and 3B are diagrams illustrating intra-cell interference and interference nulling according to the use of multiple beams according to various embodiments of the present disclosure.

Referring to FIG. 3A, interference 306 is illustrated, where a base station may simultaneously form beams 302 and 304 orienting toward different directions in order to transmit a signal to users 320 (e.g., user 1) and 330 (e.g., user 2) situated in the different directions. Each beam is configured with a main beam orienting toward a main direction, namely a main lobe, and multiple side lobes formed in different directions from the main beam. In this case, at least one side lobe of the beam 302 for user 320 may overlap with the main lobe of the beam 304 for user 330, and due to this, the side lobe acts as interference 306 to the user 320. In actual communication, the interference 306 caused by the side lobe beam is not negligible. Therefore, intra-cell interference, particularly, interference 306 due to a side lobe has to be considered in order to simultaneously serve multiple users.

Referring to FIG. 3B, multiple beams 312 and 314 are illustrated, such that a base station, when forming the beam 312 for a user 320 (e.g., user 1), may remove (or minimize) intra-cell interference introduced to a user 330 (e.g., user 2) by forming nulling in the direction of the user 330. In a system using multiple beams for multiple users, interference between the users may be removed using a wide range of nulling, namely, wide nulling. The beam 312 to which the wide nulling is applied does not form a side lobe in the direction of the user 330 as illustrated, thereby minimizing interference with the user 330. The wide nulling may be performed on a predetermined controllable region, with a designated direction, for example, the direction of the side lobe as a main direction. In one example, the wide nulling region is applied for the user 320 and exists over the whole main lobe of the beam 314 corresponding to the user 330.

As described above, intra-cell interference can be reduced through the wide nulling technique, thereby maintaining each user's received power at a constant level and enhancing a communication environment.

Figure 4:
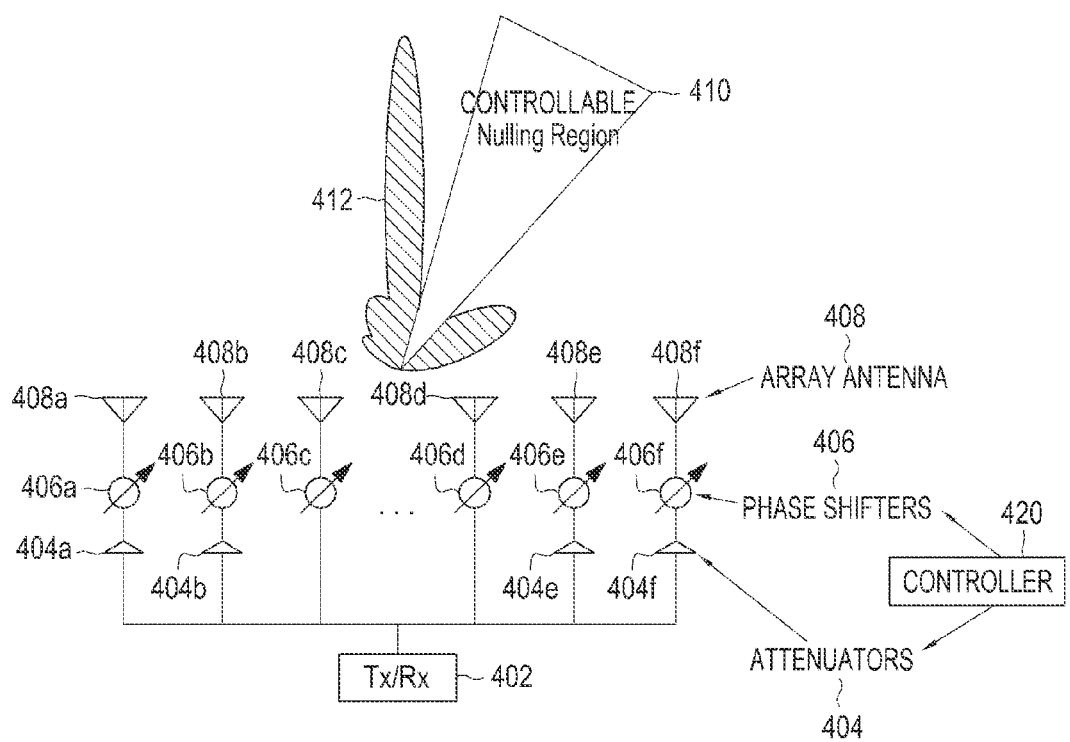
FIG. 4 illustrates a structure of a beamforming apparatus for wide nulling according to an embodiment of the present disclosure.

FIG. 4 illustrates a structure of a beamforming apparatus for wide nulling according to an embodiment of the present disclosure. Here, the beamforming apparatus may be a base station or user equipment.

Referring to FIG. 4, various components of the beamforming apparatus are illustrated, where the beamforming apparatus may include a transceiver 402 connected to a phase array directly or through controllable attenuators 404 (including 404a, 404b, 404e, and 404f), and where the phase array is configured with a plurality of phase shifters 406 (including 406a, 406b, 406c, 406d, 406e, and 406f). The phase shifters 406 are connected to a plurality of antenna elements 408a, 408b, 408c, 408d, 408e, and 408f constituting an array antenna 408, respectively, to determine gains in the corresponding directions.

The attenuators 404 are applied only to a small number of antenna elements 408a, 408b, 408e, and 408f, for example, one or two antenna elements on both sides of the array antenna. Referring to FIG. 4, the phase shifters 406a and 406b corresponding to the first and second antenna elements 408a and 408b are connected to the transceiver 402 through the attenuators 404a and 404b, and the phase shifters 406e and 406f corresponding to the last two antenna elements 408e and 408f are connected to the transceiver 402 through the attenuators 404e and 404f. The phase shifters 406c and 406d corresponding to the remaining antenna elements 408c and 408d are connected to the transceiver 402 without any attenuator.

A controller 420 controls the attenuators 404 and the phase shifters 406 based on feedback information from receivers (e.g., multiple pieces of user equipment) and quality predicted for beams to perform beamforming including wide nulling. The array antenna 408 transmits a beam 412 having a controllable nulling region 410.

As described above, wide nulling can be applied using a relatively small number of attenuators, thereby reducing interference introduced to another user within a cell and minimizing power consumption and heat generation.

Figure 5:
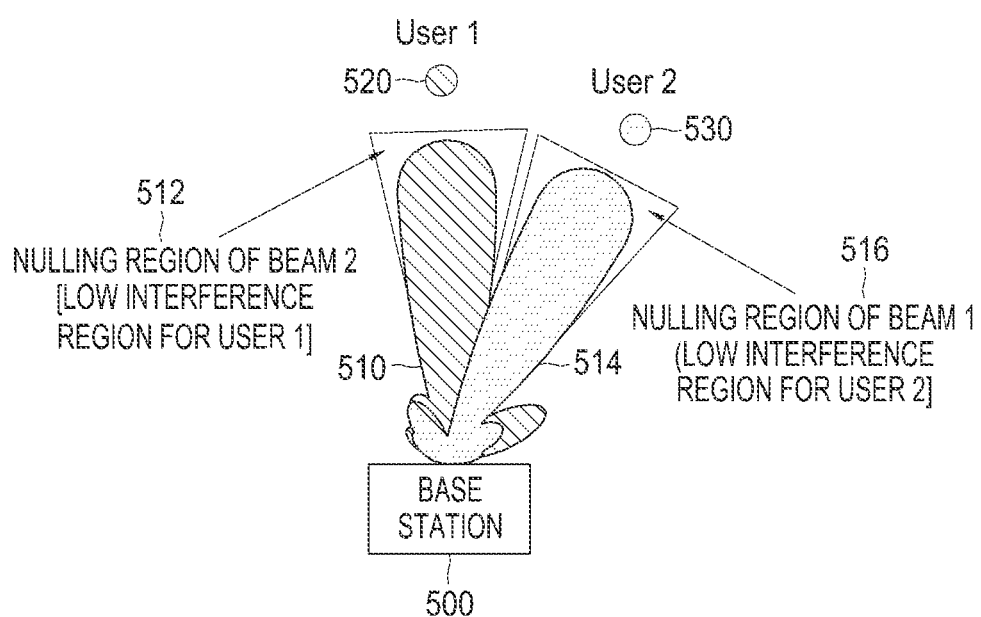
FIG. 5 illustrates beam patterns to which wide nulling is applied according to an embodiment of the present disclosure.

FIG. 5 illustrates beam patterns to which wide nulling is applied according to an embodiment of the present disclosure.

Referring to FIG. 5, a base station 500 is illustrated, such that, in order to transmit a signal to user 1 (520) and user 2 (530) who are situated in different directions, the base station 500 may simultaneously form beam 1 (510) and beam 2 (514) orienting toward the corresponding directions. Nulling region 1 (512) for beam 2 (514) may correspond to the direction of beam 1 (510) orienting toward user 1 (520). That is, nulling region 1 (512) is a low interference region for user 1 (520). Nulling region 2 (516) for beam 1 (510) may correspond to the direction of beam 2 (514) orienting toward user 2 (530). That is, nulling region 2 (516) is a low interference region for user 2 (530).

Wide nulling is effective since it is difficult for a base station to accurately identify a location, namely a direction, of a user. That is, the user feeds back only at least one beam index having a high received-power level and therefore, the base station has difficulty in accurately identifying the location of the user. Null broadening or side lobe minimization may be used as a wide nulling technique.

When a number of antennas is N, response for each angle ($\theta$) of an array antenna is given by the following Equation 1.

$$B(\theta) = \sum_{n=1}^{N} w_n \exp\left(j\frac{2\pi d}{\lambda}\sin\theta\left(n-1-\frac{N-1}{2}\right)\right) \quad \text{Equation 1}$$

where d denotes an interval between antennas in an array antenna, $\lambda$ denotes a wave length, and $w_n$ denotes a weight (i.e., gain) of the nth antenna element and can be implemented by an attenuator or a phase shifter.

A nulling region can be configured by the following Equation 2.

$$\theta_m \in \{\text{Nulling region}\}, m=1,\ldots,M \quad \text{Equation 2}$$

where M denotes the size of a configurable nulling region and is set to a smaller value than N in units of a beam angle for each antenna element.

M×N matrix [0] according to M angles is defined by the following Equation 3.

$$A_c(m,n) = \exp\left(j\frac{2\pi d}{\lambda}\sin\theta_m\left(n-1-\frac{N-1}{2}\right)\right), \quad \text{Equation 3}$$
$$m=1,\ldots,M, n=1,\ldots,N$$

where [0](m,n) is a component of matrix [0] and means a component on mth row and nth column.

Since $w_n$ and components of [0] are complex numbers, a real number vector $\vec{w}$ corresponding to $w_n$ and [0] having real number components corresponding to [0] are set by the following Equations 4 and 5, respectively, for brevity of calculation.

$$\vec{w} = [w_{r1} \ldots w_{rN} w_{i1} \ldots w_{iN}]^T \quad \text{Equation 4}$$

$$A_o = \begin{bmatrix} \text{Re}\{A_c\} & -\text{Im}\{A_c\} \\ \text{Im}\{A_c\} & \text{Re}\{A_c\} \end{bmatrix} \quad \text{Equation 5}$$

where $w_{r1}$ denotes a real number value of the first element of $w_n$, and $w_{i1}$ denotes an imaginary number value of the first element of $w_n$.

For beam nulling, $\vec{w}$ is found to minimize the following Equation 6.

$$\|A_o \cdot \vec{w}\|_2 \quad \text{Equation 6}$$

However, since beam nulling is not related to a gain of a main beam, a limiting condition such as Equation 7 is required for interference nulling.

$$\|A_t \cdot \vec{w}\|_2 \geq Th \quad \text{Equation 7}$$

[0] is obtained by transforming response of an angle corresponding to a particular main beam into a matrix form such as [0], and Th is a threshold value determined for interference nulling. The particular main beam means a main lobe beam of a beam subject to interference removal.

Equation 6 may be rewritten as Equation 8 below.

$$\min \mu A_o \cdot \vec{w}\|_2 \Leftrightarrow \min \vec{w}^T Q_o \vec{w}, Q_o = A_o^T \cdot A_o \quad \text{Equation 8}$$

Likewise, Equation 7 may be rewritten as Equation 9 below.

$$\|A_t \cdot \vec{w}\|_2 \geq Th \Leftrightarrow \vec{w}^T Q_t \vec{w} \geq Th^2, Q_t = A_t^T \cdot A_t \quad \text{Equation 9}$$

Last, the following limitation is required to remove or minimize the use of an attenuator.

$$w_{rk}^2 + w_{ik}^2 = |w_{ok}|^2, k=1,\ldots,N \quad \text{Equation 10}$$

However, since Equation 10 was known as Nondeterministic Polynomial (NP)-hard, the following Equations 11 and 12 are used.

$$\vec{w}^T Q_k \vec{w} = |w_{ok}|^2, \quad \text{Equation 11}$$
$$Q_k(m,n) = \begin{cases} 1 & \text{if } m=n=k, \\ 1 & \text{if } m=n=k+N. \\ 0 & \text{elsewhere} \end{cases}$$

$$W - \vec{w}\vec{w}^T \geq 0 \quad \text{Equation 12}$$

where W means a predefined set of antenna weights. Namely, an antenna weight satisfying Equation 12 may be selected from W.

Then, the following Equation 13 is obtained.

$$tr(Q_k \cdot W) \geq tr(Q_k \vec{w}\vec{w}^T) = tr(\vec{w}^T Q_k \vec{w}) = |w_{ok}|^2 \quad \text{Equation 13}$$

where tr( ) means a trace matrix and calculates the sum of all diagonal components of a matrix.

Finally, an optimization problem such as Equation 14 may be set.

$$\text{minimize; } tr(Q_o \cdot W)$$

$$\text{subject to; } tr(Q_t \cdot W) \geq Th^2$$

$$tr(Q_k \cdot W) = |w_{ok}|^2, k=1,\ldots,N$$

$$0 \leq W(k,k) \leq |w_{ok}|^2$$

$$0 \leq W(k+N, k+N) \leq |w_{ok}|^2, k=1,\ldots,N \quad \text{Equation 14}$$

Using Singular Value Decomposition (SVD), $\vec{w}$ can be calculated from W obtained by solving the optimization problem of Equation 14, as in Equation 15.

$$W = U \cdot \Sigma \cdot V^H = U \cdot \Sigma^{1/2} \cdot \Sigma^{1/2} \cdot V^H, \vec{w} = \text{first column of } U \cdot \Sigma^{1/2} \quad \text{Equation 15}$$

where $\vec{w}$ calculated through Equation 15 is a weight of an antenna element for wide nulling, namely, a control value of an attenuator and a phase shifter.

Although side lobe minimization through wide nulling which may be implemented as described above is very effective for interference nulling, a gain of a main beam may be decreased according to the setting of Th. Since the gain of the main beam has a greater effect on a Signal to Interference and Noise Ratio (SINR) in actual communication, the SINR is more sensitive to the gain of the main beam than a side lobe. Accordingly, it is necessary to minimize gain loss of the main beam and restrict the gain of the main lobe to a smaller value than Th. Therefore, the following Equation 16 can be set.

minimize; $1-tr(Q_t \cdot W)$ subject to; $tr(Q_{om} \cdot W) \leq Th^2$ $tr(Q_k \cdot W) = |w_{ok}|^2, k=1, \ldots, N$ $0 \leq W(k,k) \leq |w_{ok}|^2$ $0 \leq W(k+N,k+N) \leq |w_{ok}|^2, k=1, \ldots, N$  Equation 16

Figure 6:
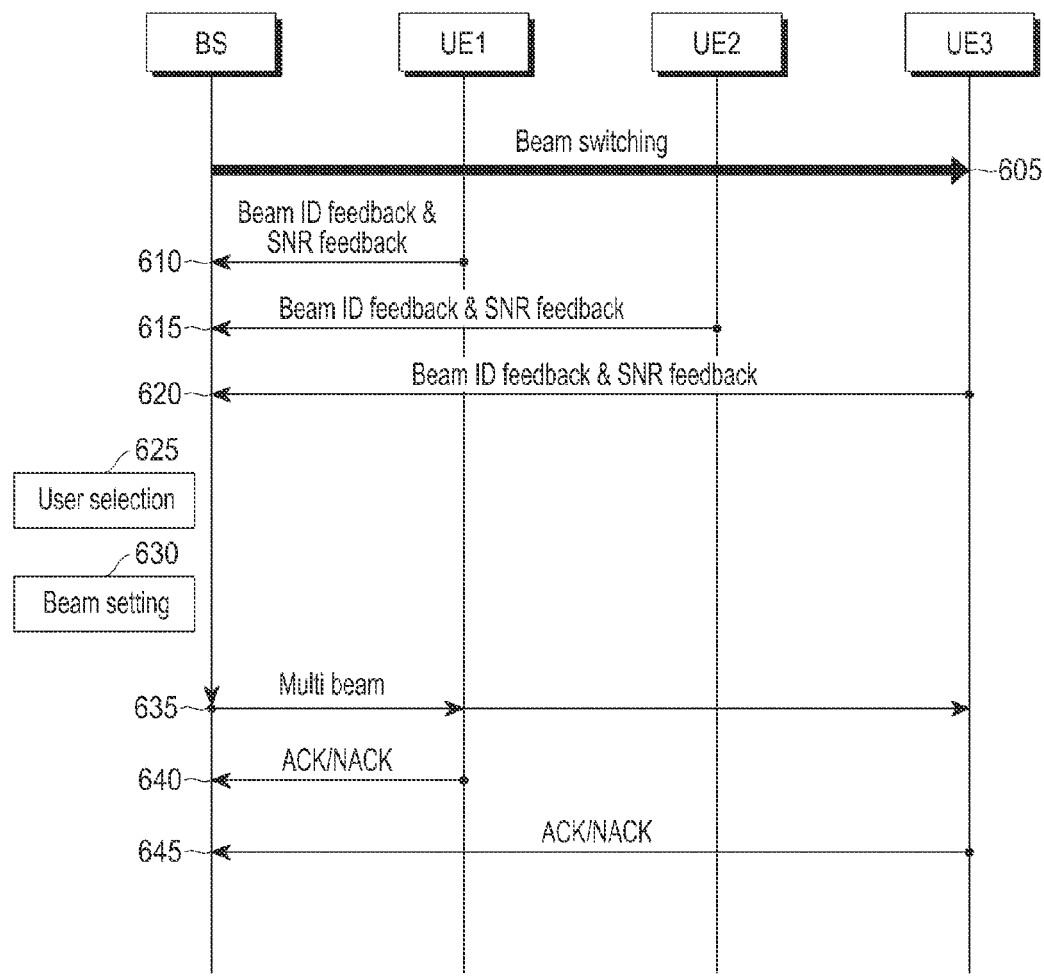
FIG. 6 is a message flowchart illustrating a beam operating procedure of multiple users according to an embodiment of the present disclosure.

FIG. 6 is a message flowchart illustrating a beam operating procedure of multiple users according to an embodiment of the present disclosure. Here, a case is illustrated in which three pieces of user equipment are located within service coverage of a base station.

Referring to FIG. 6, a flowchart illustrating a beam operation procedure of a Base Station (BS) and multiple pieces of user equipment (e.g., User Equipment 1 (UE1), User Equipment 2 (UE2) and User Equipment 3 (UE3)) is illustrated, such that in operation 605, the base station transmits pilot signals using all transmittable beams thereof through beam switching. The base station may transmit the respective pilot signals through N transmission beams during N slots prescribed between the multiple pieces of user equipment. The multiple pieces of user equipment measure received power of the signals received from the base station during the N slots and determine a beam index corresponding to the slot during which the highest received-power level higher than a prescribed threshold value is detected. In one example, when the highest received-power level higher than the prescribed threshold value is detected at the nth slot, the user equipment may determine beam index n as the best beam. The user equipment may determine beam indices corresponding to one or more best beams.

In operations 610, 615, and 620, the multiple pieces of user equipment feed a beam index representing the best beam thereof and channel information on the best beam back to the base station. The channel information may be, for example, a beam ID feedback and a SINR or a Signal Noise Ratio (SNR) measured for the best beam.

In operation 625, the base station performs scheduling based on the beam indices or the channel information to select at least one piece of user equipment that will perform transmission/reception at a particular slot and determines a transmission/reception beam and/or a resource block for the user equipment. In one example, when user equipment 1 and 3 are scheduled, beam 2 may be selected for user equipment 1 and beam 6 may be selected for user equipment 3. In cases where multiple user transmission is possible, the base station selects the most appropriate user pair, namely two pieces of user equipment, which the base station can simultaneously support, and performs quasi-channel modeling for the selected user pair. Here, the quasi-channeling modeling means that the scheduled users are modeled by Line of Sight (LOS) channels in terms of the base station.

In operation 630, the base station may perform beam setting for wide nulling when necessary in order to remove intra-cell interference of the scheduled user equipment. Specifically, in cases where channel information, namely an SNR, of particular user equipment does not satisfy required QoS, the base station applies nulling to a side lobe formed in the direction of the user equipment. When the above example is referred to, if the SNR reported from UE3 is smaller than a threshold value according to the required QoS, the base station may perform wide nulling for the direction of beam 6 on beam 2 for UE1 to remove a particular side lobe formed by beam 2. Through the beam setting, the base station determines weights to which wide nulling for an array antenna is applied. Examples of a possible scenario for the beam setting will be described below.

In operation 635, the base station forms multiple beams by applying the weights determined through the beam setting to antenna elements of the array antenna. In one example, as a scenario for the beam setting, the multiple beams may include the first generated beam for a user (hereinafter, referred to as a primary beam) and a wide nulling beam according to the beam setting. Downlink signals for the scheduled user equipment are transmitted through the multiple beams.

In operations 640 and 645, Acknowledgement (ACK)/Non-Acknowledgement (NACK) signals that are answers for the downlink signals are received from the scheduled user equipment, that is, UE1 and UE3. In cases where ACK signals are received from the scheduled user equipment, the base station continues to use the multiple beams having undergone the beam setting to simultaneously serve the scheduled user equipment. In contrast, in cases where a NACK signal is received from at least one piece of scheduled user equipment, the base station transmits a signal to the two pieces of user equipment by distributing time resources.

Figure 7:
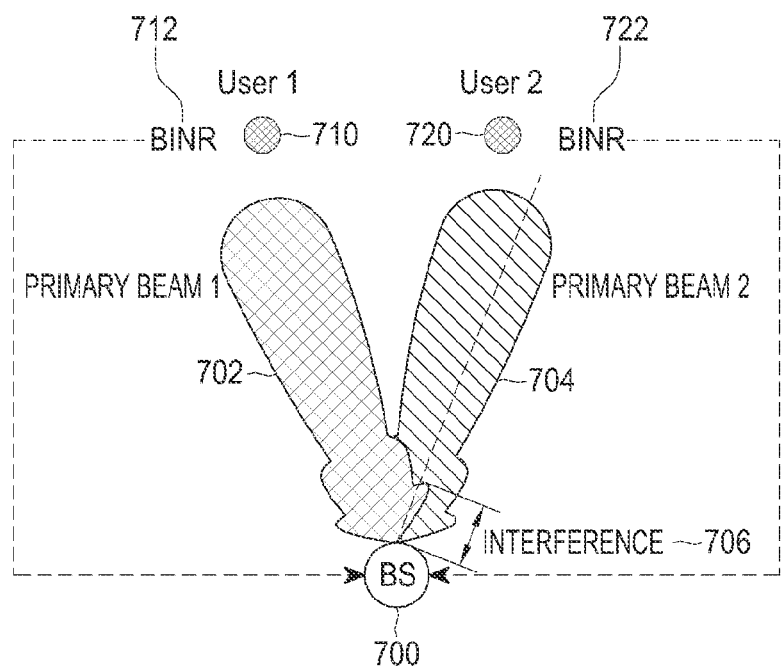
FIG. 7 illustrates a scenario of beam setting according to an embodiment of the present disclosure.

FIG. 7 illustrates a scenario of beam setting according to an embodiment of the present disclosure.

Referring to FIG. 7, a base station 700 is illustrated, where the base station 700 selects a user pair (user 1 (710) and user 2 (720)) that will be permitted to perform communication for a particular time unit through scheduling and forms primary beam 1 (702) for user 1 (710) (i.e., UE1) and primary beam 2 (704) for user 2 (720) (i.e., UE2). Here, one side lobe of primary beam 1 (702) overlaps with the main beam direction of primary beam 2 (704), and may accordingly act as interference 706 against primary beam 2 (704).

The base station 700 may predict beam quality of user 1 (710) for nulling beam 1 from feedback of user 1 (710) on the previously received primary beam 1 (702) by modeling the channel corresponding to user 1 (710) as a quasi-LOS channel. Likewise, the base station 700 may predict beam quality of user 2 (720) for nulling beam 2 by modeling the channel corresponding to user 2 (720) as a quasi-LOS channel. The beam quality may be calculated, for example, as a Beam to Interference and Noise Ratio (BINR), such as BINR 712 and BINR 722. The base station performs beam setting for application of wide nulling using the BINR predicted for each user.

Hereinafter, examples of a possible scenario for beam setting of the scheduled user pair will be described.

First, when the primary beams of both of the users are repetitively used, if QoS of all the users is satisfied, the base station communicates with the two users using the two primary beams repetitively.

Second, when both of the users repetitively use the primary beams, if both of the two users do not satisfy QoS, the base station calculates QoS again by applying wide nulling to both of the beams of the two users. Nevertheless, if either of the two users does not satisfy QoS, the base station transmits respective signals to the two users by dividing a time slot. That is, the base station determines that simultaneous transmission of the multiple users is impossible.

Third, when both of the users repetitively use the primary beams, if one user (i.e., the second user) does not satisfy QoS, the base station calculates QoS of the two users again by making a side lobe corresponding to the second user subject to nulling. Nevertheless, if the second user does not satisfy QoS, the base station transmits respective signals to the two users by dividing a time slot.

Fourth, when both of the users repetitively use the primary beams, if one user (i.e., the second user) does not satisfy QoS, the base station calculates QoS of the two users again by making a side lobe corresponding to the second user, among the first user's beams, subject to nulling. If the QoS of the two users is completely satisfied, the base station transmits signals for the two users using the nulled beam of the first user and the primary beam of the second user.

Last, when both of the users repetitively use the primary beams, if one user (i.e., the second user) does not satisfy QoS, the base station calculates QoS of the two users again by making a side lobe corresponding to the second user, among the first user's beams, subject to nulling. After the nulling, if the first user is changed into a state of not satisfying QoS and the second user satisfies QoS, the base station calculates QoS again by applying nulling to the beams of both the first user and the second user. Nevertheless, if there is still a user that does not exceed QoS, the base station transmits respective signals to the two users by dividing a time slot.

Figure 8:
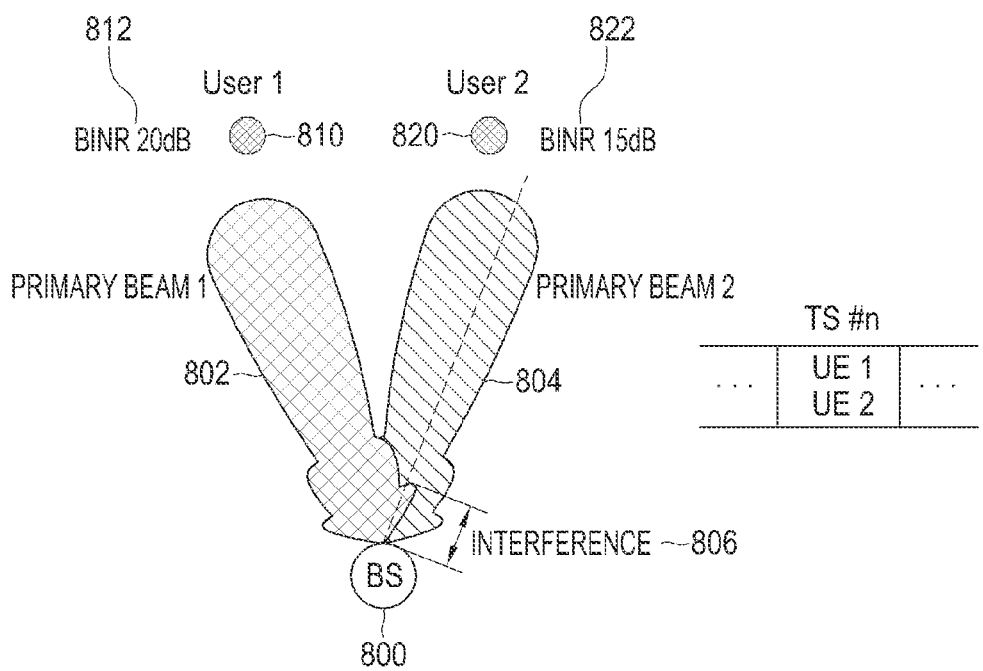
FIG. 8 illustrates a first scenario of beam setting according to an embodiment of the present disclosure.

FIG. 8 illustrates a first scenario of beam setting according to an embodiment of the present disclosure. Here, a case is illustrated in which a threshold value of a BINR according to QoS required for two users is 10 dB.

Referring to FIG. 8, a base station 800 is illustrated, there where the base station 800 selects a user pair (user 1 (810) and user 2 (820)) that will be permitted to perform communication for a particular time unit through scheduling and forms primary beam 1 (802) for user 1 (810) (i.e., UE 1) and primary beam 2 (804) for user 2 (820) (i.e., UE 2). Here, one side lobe of primary beam 1 (802) overlaps with the main beam direction of primary beam 2 (804), and may accordingly act as interference 806 against user 2 (820).

A BINR 812 of user 1 (810) predicted for primary beam 1 (802) is 20 dB, and a BINR 822 of user 2 (820) predicted for primary beam 2 (804) is 15 dB. Since both of the two primary beams 802 and 804 have the BINRs greater than a QoS reference of 10 dB, the base station 800 determines to simultaneously transmit signals to the primary beams 802 and 804 for the two users 810 and 820 at a time slot #n which is a scheduled time unit.

Figure 9A:
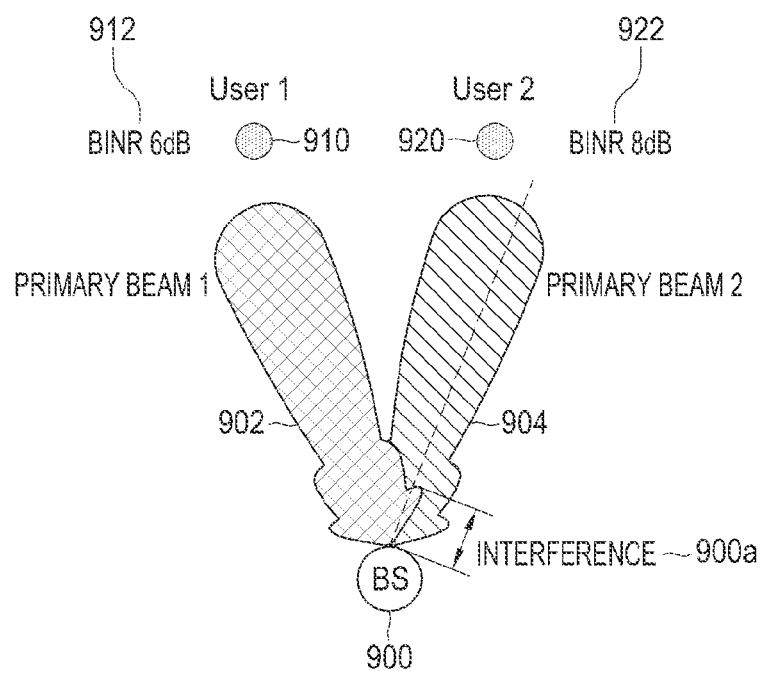
FIGS. 9A and 9B illustrate a second scenario of beam setting according to various embodiments of the present disclosure.
Figure 9B:
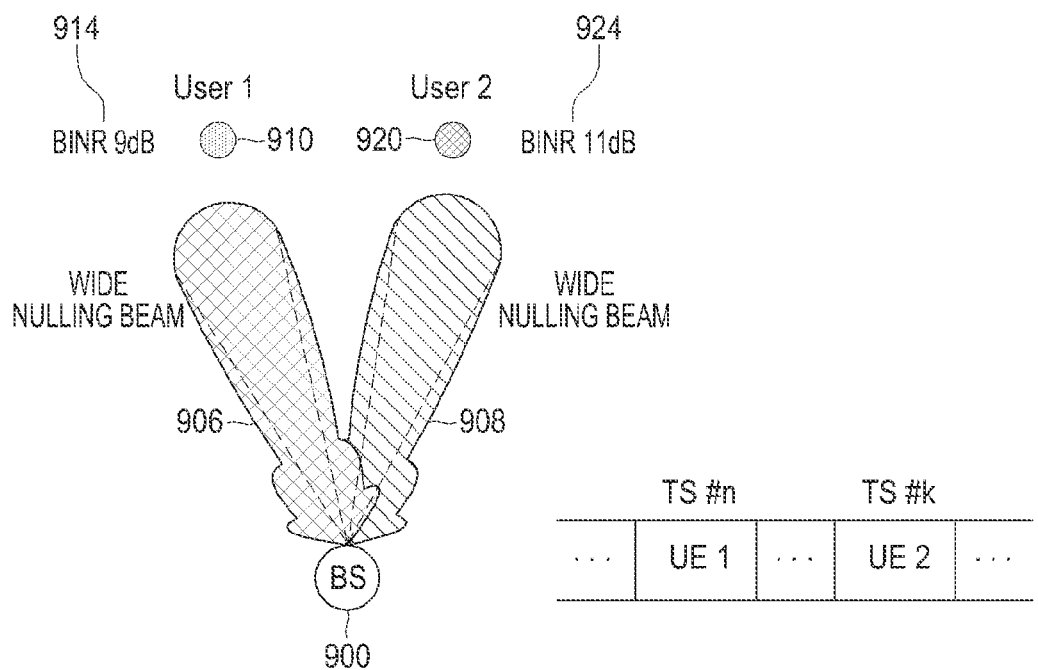

FIGS. 9A and 9B illustrate a second scenario of beam setting according to various embodiments of the present disclosure. Here, a case is illustrated in which QoS required for two users is 10 dB.

Referring to FIG. 9A, a base station 900 is illustrated, where the base station 900 selects a user pair (user 1 (910) and user 2 (920)) that will be permitted to perform communication for a particular time unit through scheduling and forms primary beam 1 (902) for user 1 (910) (i.e., UE1) and primary beam 2 (904) for user 2 (920) (i.e., UE2). Here, one side lobe of primary beam 1 (902) overlaps with the main beam direction of primary beam 2 (904) to act as interference 900a against user 2 (920).

A BINR 912 of user 1 (910) predicted for primary beam 1 (902) is 6 dB, and a BINR 922 of user 2 (920) predicted for primary beam 2 (904) is 8 dB. Since both of the two primary beams 902 and 904 have the BINRs smaller than a QoS reference of 10 dB, the base station 900 applies wide nulling to both of the beams 902 and 904 of the two users 910 and 920 and calculates BINRs for the users 910 and 920 again.

Referring to FIG. 9B, a base station 900 is illustrated, where a BINR 914 for a wide nulling beam 906 of user 1 (910) is 9 dB, and a BINR 924 for a wide nulling beam 908 of user 2 (920) is 11 dB. Since the BINR 914 of user 1 (910) is smaller than the QoS reference of 10 dB, the base station 900 determines that simultaneous transmission for the two users 910 and 920 is impossible and determines to transmit respective signals for the two users 910 and 920 at time slots #n and #k which are a scheduled time unit. In this case, primary beams 902 and 904 may be used for the two users 910 and 920.

Figure 10A:
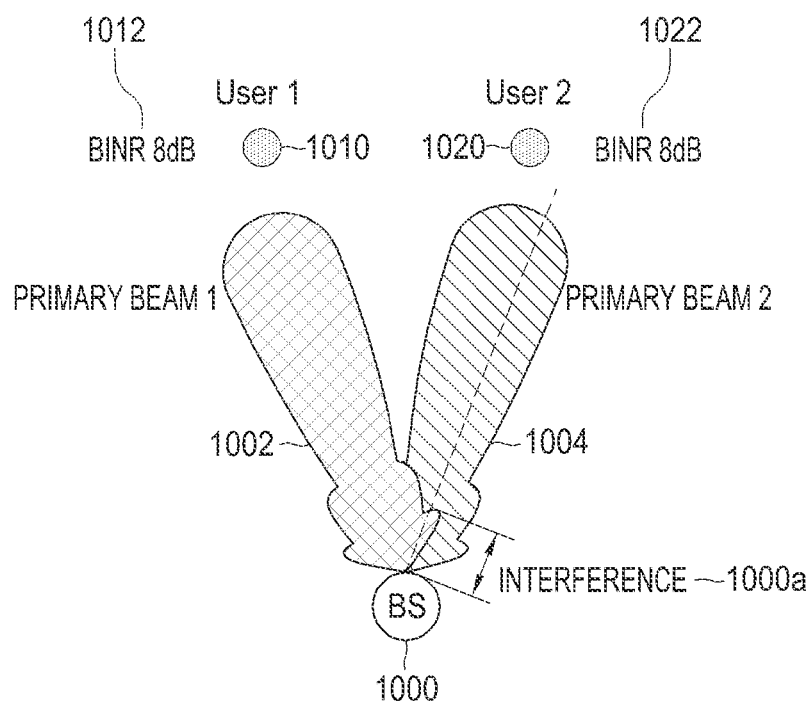
FIGS. 10A and 10B illustrate a third scenario of beam setting according to various embodiments of the present disclosure.
Figure 10B:
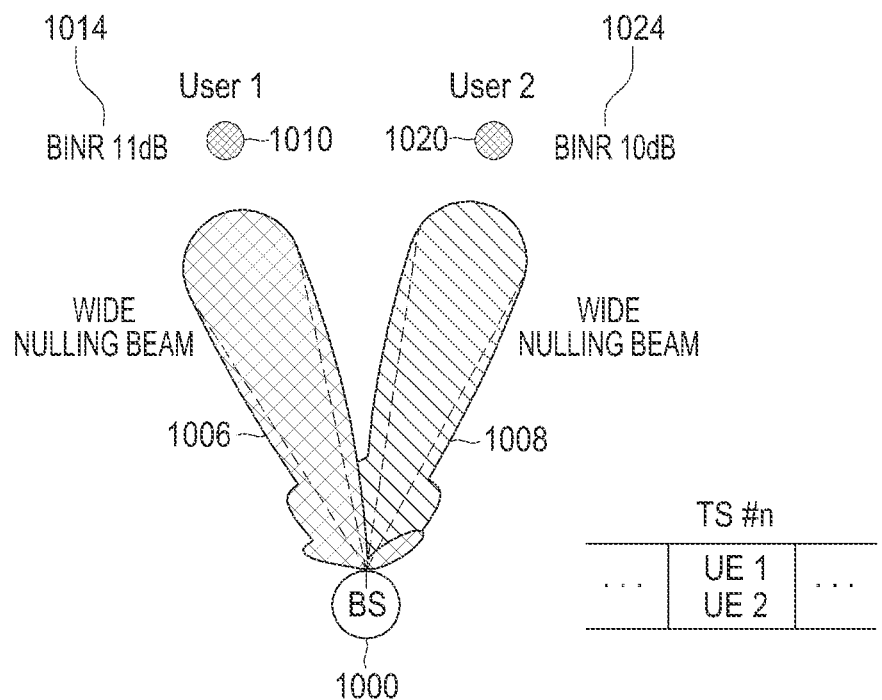

FIGS. 10A and 10B illustrate a third scenario of beam setting according to various embodiments of the present disclosure. Here, a case is illustrated in which QoS required for two users is 10 dB.

Referring to FIG. 10A, a base station 1000 is illustrated, where the base station 1000 selects a user pair (user 1 (1010) and user 2 (1020)) that will be permitted to perform communication for a particular time unit through scheduling and forms primary beam 1 (1002) for user 1 (1010) (i.e., UE1) and primary beam 2 (1004) for user 2 (1020) (i.e., UE2). Here, one side lobe of primary beam 1 (1002) overlaps with the main beam direction of primary beam 2 (1004) to act as interference 1000a against user 2 (1020).

A BINR 1012 of user 1 (1010) predicted for primary beam 1 (1002) and a BINR 1022 of user 2 (1020) predicted for primary beam 2 (1004) are all 8 dB. Since both of the two primary beams 1002 and 1004 have the BINRs smaller than a QoS reference of 10 dB, the base station 1000 applies wide nulling to both of the beams 1002 and 1004 of the two users 1010 and 1020 and calculates BINRs for the users 1010 and 1020 again.

Referring to FIG. 10B, a base station 1000 is illustrated, where a BINR 1014 for a wide nulling beam 1006 of user 1 (1010) is 11 dB, and a BINR 1024 for a wide nulling beam 1008 of user 2 (1020) is 10 dB. Since the BINRs 1014 and 1024 of the two users 1010 and 1020 are both greater than the QoS reference of 10 dB, the base station 1000 determines that simultaneous transmission for the two users 1010 and 1020 is possible and determines to simultaneously transmit respective signals for the two users 1010 and 1020 through the wide nulling beams 1006 and 1008 at a time slot #n which is a scheduled time unit.

Figure 11A:
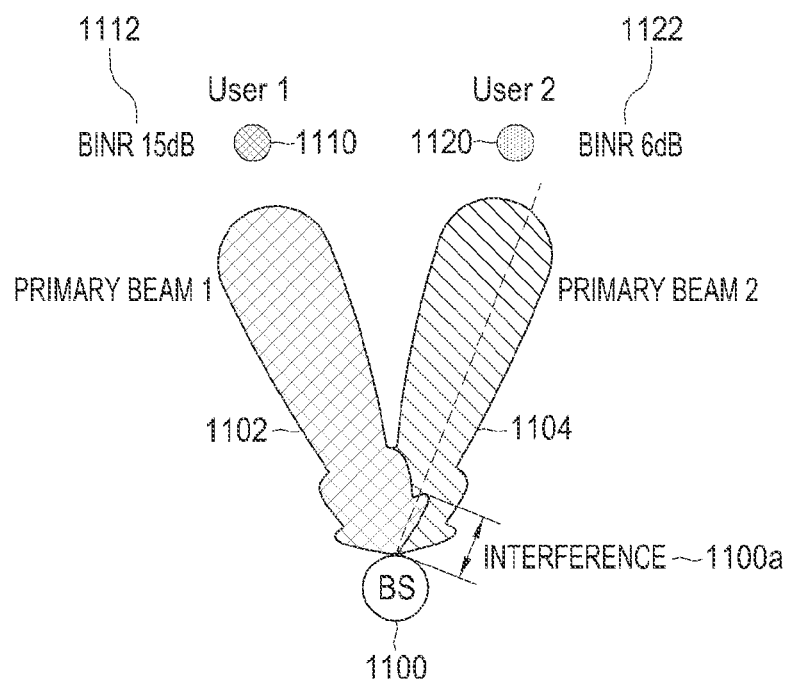
FIGS. 11A and 11B illustrate a fourth scenario of beam setting according to various embodiments of the present disclosure.
Figure 11B:
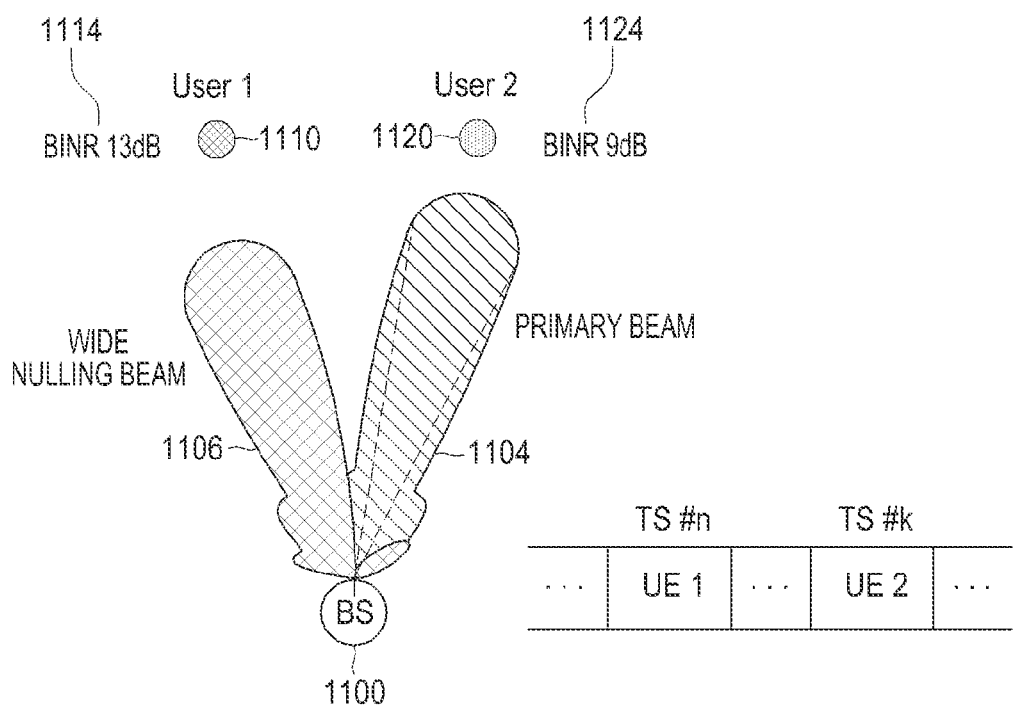

FIGS. 11A and 11B illustrate a fourth scenario of beam setting according to various embodiments of the present disclosure. Here, a case is illustrated in which QoS required for two users is 10 dB.

Referring to FIG. 11A, a base station 1100 is illustrated, where the base station 1100 selects a user pair (user 1 (1110) and user 2 (1120)) that will be permitted to perform communication for a particular time unit through scheduling and forms primary beam 1 (1102) for user 1 (1110) (i.e., UE1) and primary beam 2 (1104) for user 2 (1120) (i.e., UE2). Here, one side lobe of primary beam 1 (1102) overlaps with the main beam direction of primary beam 2 (1104) to act as interference 1100a against user 2 (1120).

A BINR 1112 of user 1 (1110) predicted for primary beam 1 (1102) is 15 dB, and a BINR 1122 of user 2 (1120) predicted for primary beam 2 (1104) is 6 dB. Since primary beam 2 (1104) of user 2 (1120) has the BINR smaller than the QoS reference of 10 dB, the base station 1100 applies wide nulling to primary beam 1 (1102) having a side lobe corresponding to primary beam 2 (1104) and calculates BINRs for the users 1110 and 1120 again.

Referring to FIG. 11B, a base station 1100 is illustrated, where a BINR 1114 for a wide nulling beam 1106 of user 1 (1110) is 13 dB, and a new BINR 1124 for a primary beam 1104 of user 2 (1120) is 9 dB. Since the BINR 1124 of user 2 (1120) is smaller than the QoS reference of 10 dB, the base station 1100 determines that simultaneous transmission for the two users 1110 and 1120 is impossible and determines to transmit respective signals for the two users 1110 and 1120 at different time slots #n and #k which are a scheduled time unit. In this case, the wide nulling beam 1106 and the primary beam may be used for the two users 1110 and 1120, respectively.

Figure 12A:
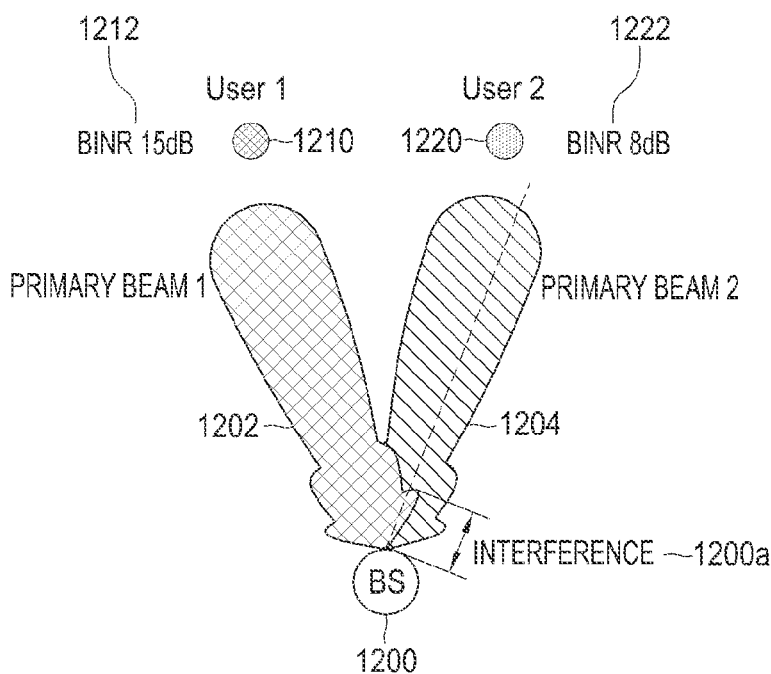
FIGS. 12A and 12B illustrate a fifth scenario of beam setting according to various embodiments of the present disclosure.
Figure 12B:
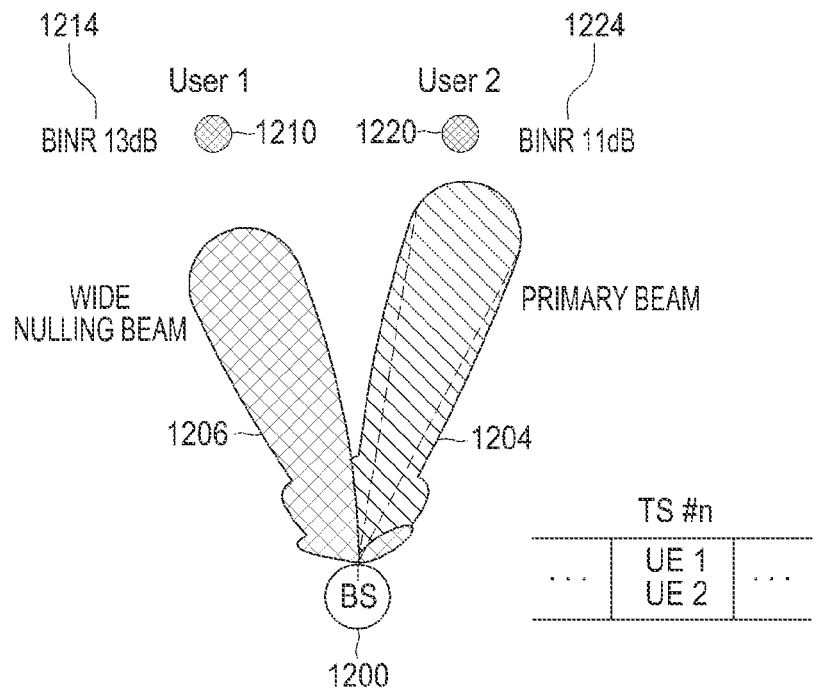

FIGS. 12A and 12B illustrate a fifth scenario of beam setting according to various embodiments of the present disclosure. Here, a case is illustrated in which QoS required for two users is 10 dB.

Referring to FIG. 12A, a base station 1200 is illustrated, where the base station 1200 selects a user pair (user 1 (1210) and user 2 (1220)) that will be permitted to perform communication for a particular time unit through scheduling and forms primary beam 1 (1202) for user 1 (1210) (i.e., UE1) and primary beam 2 (1204) for user 2 (1220) (i.e., UE2). Here, one side lobe of primary beam 1 (1202) overlaps with the main beam direction of primary beam 2 (1204) to act as interference 1200a against user 2 (1220).

A BINR 1212 of user 1 (1210) predicted for primary beam 1 (1202) is 15 dB, and a BINR 1222 of user 2 (1220) predicted for primary beam 2 (1204) is 8 dB. Since primary beam 2 (1204) of user 2 (1210) has the BINR smaller than the QoS reference of 10 dB, the base station 1200 applies wide nulling to primary beam 1 (1202) having a side lobe corresponding to primary beam 2 (1204) and calculates BINRs for the users 1210 and 1120 again.

Referring to FIG. 12B, a base station 1200 is illustrated, where a BINR 1214 for a wide nulling beam 1206 of user 1 (1210) is 13 dB, and a new BINR 1224 for the primary beam 1204 of user 2 (1220) is 11 dB. Since the BINRs 1214 and 1224 of the two users 1210 and 1220 are both greater than the QoS reference of 10 dB, the base station determines that simultaneous transmission for the two users 1210 and 1220 is possible and determines to simultaneously transmit respective signals for the two users 1210 and 1220 at a time slot #n which is a scheduled time unit. In this case, the primary beams 1202 and 1204 or, more desirably, the wide nulling beam 1206 and the primary beam 1204 may be used for the two users 1210 and 1220.

Figure 13A:
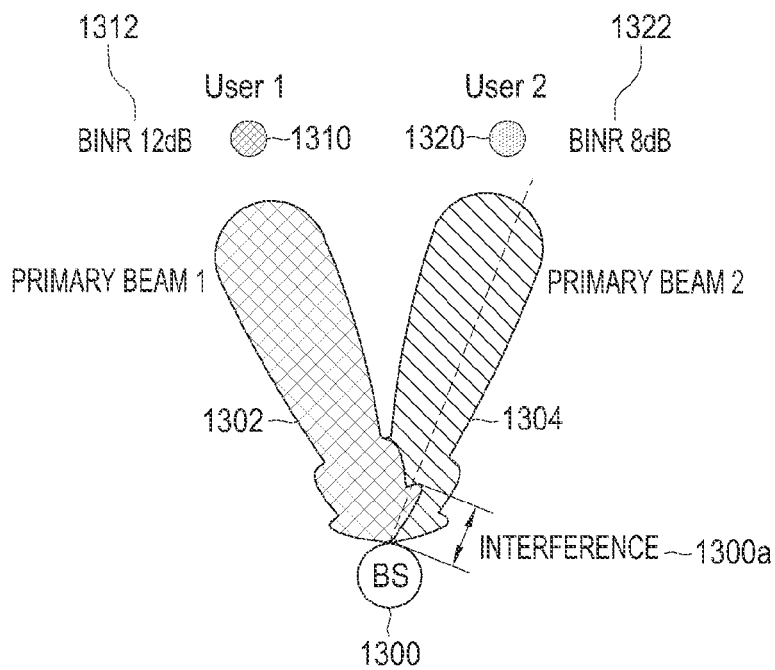
FIGS. 13A and 13B illustrate a sixth scenario of beam setting according to various embodiments of the present disclosure.
Figure 13B:
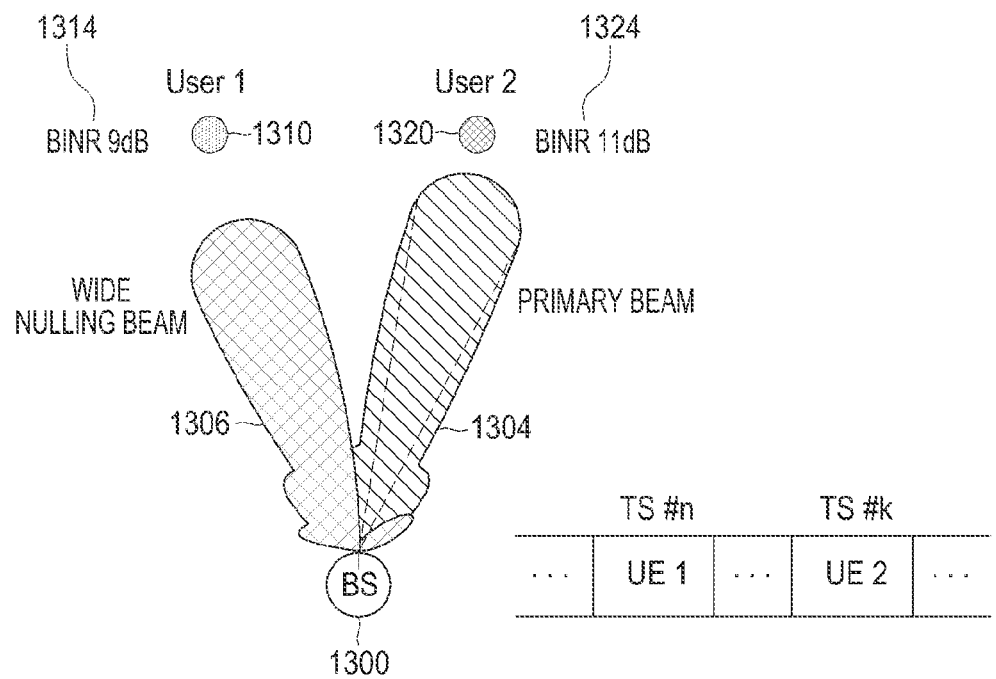

FIGS. 13A and 13B illustrate a sixth scenario of beam setting according to various embodiments of the present disclosure. Here, a case is illustrated in which QoS required for two users is 10 dB.

Referring to FIG. 13A, a base station 1300 is illustrated, where the base station 1300 selects a user pair (user 1 (1310) and (user) 2 1320) that will be permitted to perform communication for a particular time unit through scheduling and forms primary beam 1 (1302) for user 1 (1310) (i.e., UE1) and primary beam 2 (1304) for user 2 (1320) (i.e., UE2). Here, one side lobe of primary beam 1 (1302) overlaps with the main beam direction of primary beam 2 (1304) to act as interference 1300a against user 2 (1320).

A BINR 1312 of user 1 (1310) predicted for primary beam 1 (1302) is 12 dB, and a BINR 1322 of user 2 (1320) predicted for primary beam 2 (1304) is 8 dB. Since primary beam 2 (1304) of user 2 (1320) has the BINR smaller than the QoS reference of 10 dB, the base station 1300 applies wide nulling to primary beam 1 (1302) having a side lobe corresponding to primary beam 2 (1304) and calculates BINRs for the users 1310 and 1320 again.

Referring to FIG. 13B, a base station 1300 is illustrated, where a BINR 1314 for a wide nulling beam 1306 of user 1 (1310) is 9 dB, and a new BINR 1324 for a primary beam 1304 of user 2 (1320) is 11 dB. Since the BINR 1314 of user 1 (1310) becomes smaller than the QoS reference of 10 dB and the BINR 1324 of user 2 (1320) becomes higher than 10 dB, the base station 1300 also applies wide nulling to the primary beam 1304 of user 2 (1320) and calculates BINRs for the users 1310 and 1320 again. Nevertheless, if both of the BINRs of the two users 1310 and 1320 do not satisfy the QoS reference, the base station 1300 determines that simultaneous transmission for the two users 1310 and 1320 is impossible and determines to transmit respective signals for the two users 1310 and 1320 at different time slots #n and #k which are a scheduled time unit.

Figure 14A:
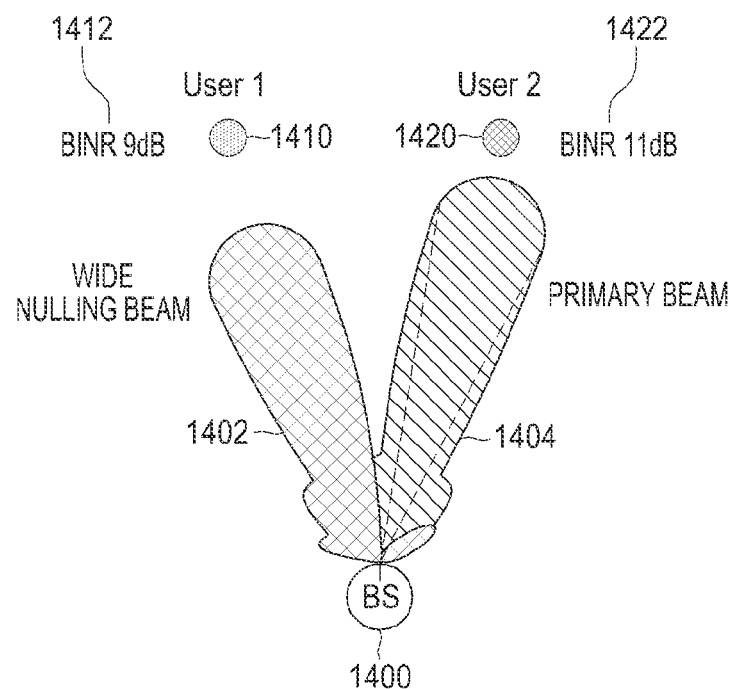
FIGS. 14A and 14B illustrate a seventh scenario of beam setting according to various embodiments of the present disclosure.
Figure 14B:
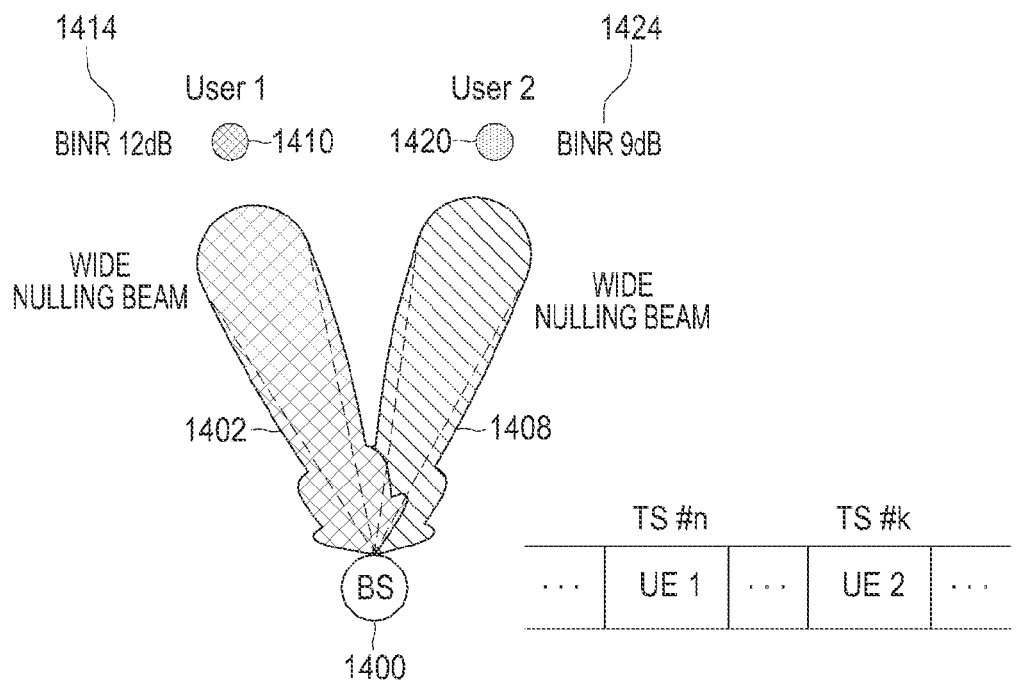

FIGS. 14A and 14B illustrate a seventh scenario of beam setting according to various embodiments of the present disclosure. Here, a case is illustrated in which QoS required for two users is 10 dB.

Referring to FIG. 14A, a base station 1400 is illustrated, where the base station 1400 applies wide nulling to user 1 (1410) of a user pair (user 1 (1410) and user 2 (1420)) that will be permitted to perform communication for a particular time unit through scheduling, and forms a wide nulling beam 1402 for user 1 (1410). A BINR 1412 of user 1 (1410) predicted for the wide nulling beam 1402 is 9 dB, and a BINR 1422 of user 2 (1420) predicted for primary beam 2 (1404) is 11 dB. Since the wide nulling beam 1402 has the BINR smaller than the QoS reference of 10 dB, the base station 1400 applies wide nulling to primary beam 2 (1404) having a side lobe corresponding to the wide nulling beam 1402 and calculates BINRs for the users 1410 and 1420 again.

Referring to FIG. 14B, a base station 1400 is illustrated, where a new BINR 1414 for a wide nulling beam 1402 of user 1 (1410) is 12 dB, and a BINR 1424 for a wide nulling beam 1408 of user 2 (1420) is 9 dB. Since user 2 (1420) having the BINR 1424 smaller than the QoS reference of 10 dB still exists, the base station 1400 determines that simultaneous transmission for the two users 1410 and 1420 is impossible and determines to transmit respective signals for the two users 1410 and 1420 at different time slots #n and #k which are a scheduled time unit. In this case, the primary beam may be used for the two users 1410 and 1420.

Figure 15A:
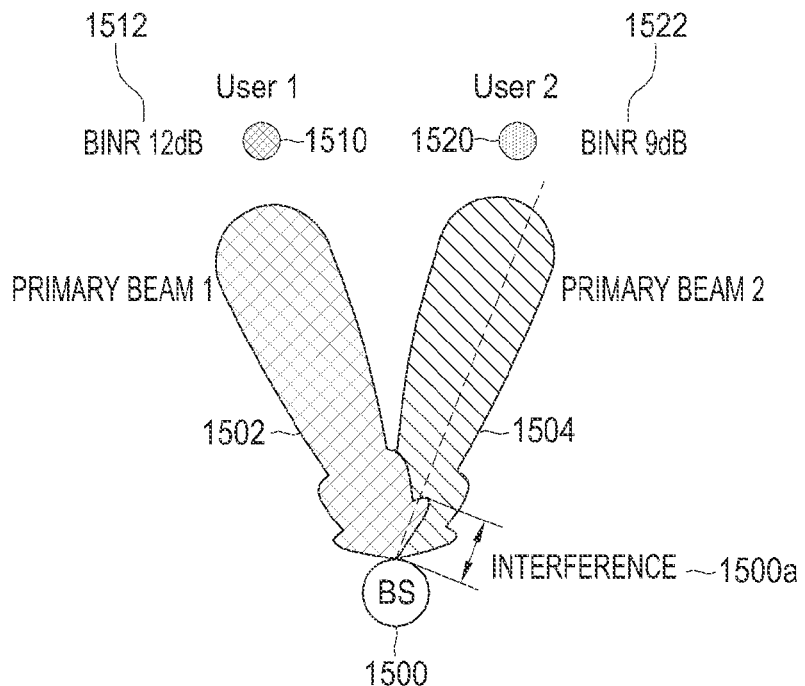
FIGS. 15A and 15B illustrate an eighth scenario of beam setting according to various embodiments of the present disclosure.
Figure 15B:
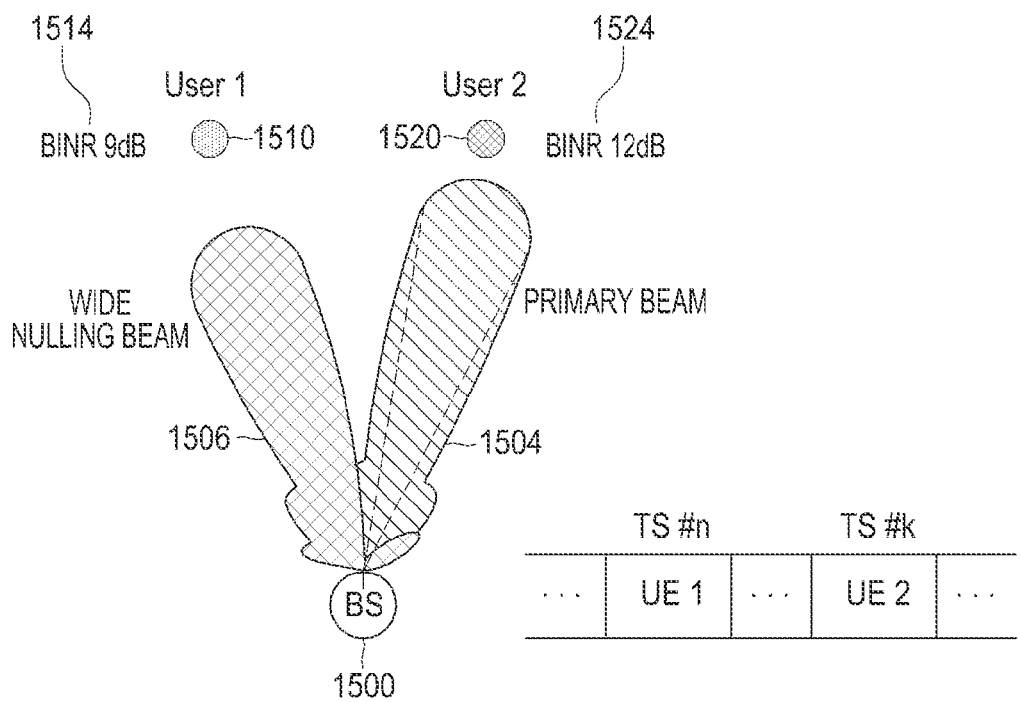

FIGS. 15A and 15B illustrate an eighth scenario of beam setting according to various embodiments of the present disclosure. Here, a case is illustrated in which QoS required for two users is 10 dB.

Referring to FIG. 15A, a base station 1500 is illustrated, where the base station 1500 selects a user pair (user 1 (1510) and user 2 (1520)) that will be permitted to perform communication for a particular time unit through scheduling and forms primary beam 1 (1502) for user 1 (1510) (i.e., UE1) and primary beam 2 (1504) for user 2 (1520) (i.e., UE2). Here, one side lobe of primary beam 1 (1502) overlaps with the main beam direction of primary beam 2 (1504) to act as interference 1500a against user 2 (1520).

A BINR 1512 of user 1 (1510) predicted for primary beam 1 (1502) is 12 dB, and a BINR 1522 of user 2 (1520) predicted for primary beam 2 (1504) is 9 dB. Since primary beam 2 (1504) of user 2 (1520) has the BINR smaller than the QoS reference of 10 dB, the base station 1500 applies wide nulling to primary beam 1 (1502) having a side lobe corresponding to primary beam 2 (1504) and calculates BINRs for the users 1510 and 1520 again.

Referring to FIG. 15B, a base station 1500 is illustrated, where a BINR 1514 for a wide nulling beam 1506 of user 1 (1510) is 9 dB, and a new BINR 1524 for a primary beam 1504 of user 2 (1520) is 12 dB. Since the BINR 1514 of user 1 (1510) becomes smaller than the QoS reference of 10 dB and the BINR 1524 of user 2 (1520) becomes higher than 10 dB, the base station 1500 also applies wide nulling to the primary beam 1504 of user 2 (1520) and calculates BINRs for the users 1510 and 1520 again. As a result, if both of the BINRs of the two users 1510 and 1520 satisfy the QoS reference, the base station 1500 determines that simultaneous transmission for the two users 1510 and 1520 is possible and determines to simultaneously transmit respective signals for the two users 1510 and 1520 at a time slot #n which are a scheduled time unit.

Figure 16A:
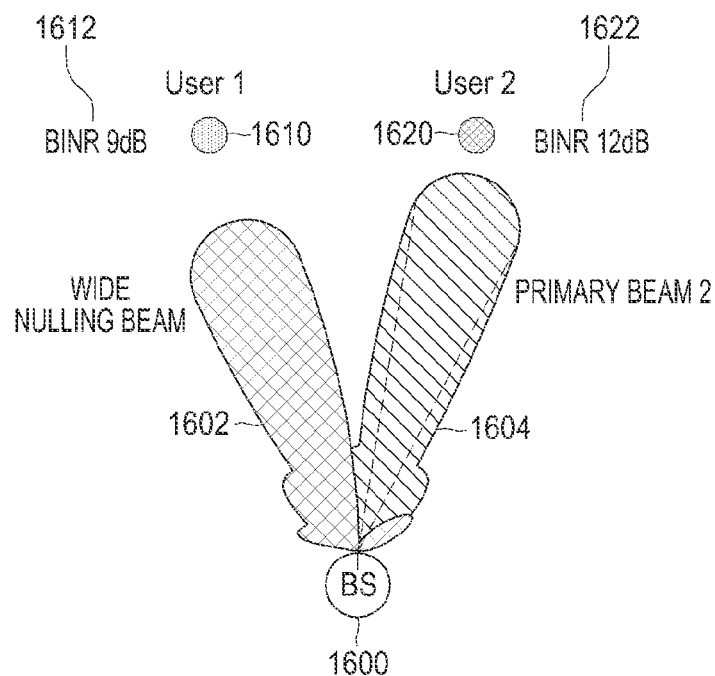
FIGS. 16A and 16B illustrate a ninth scenario of beam setting according to various embodiments of the present disclosure.
Figure 16B:
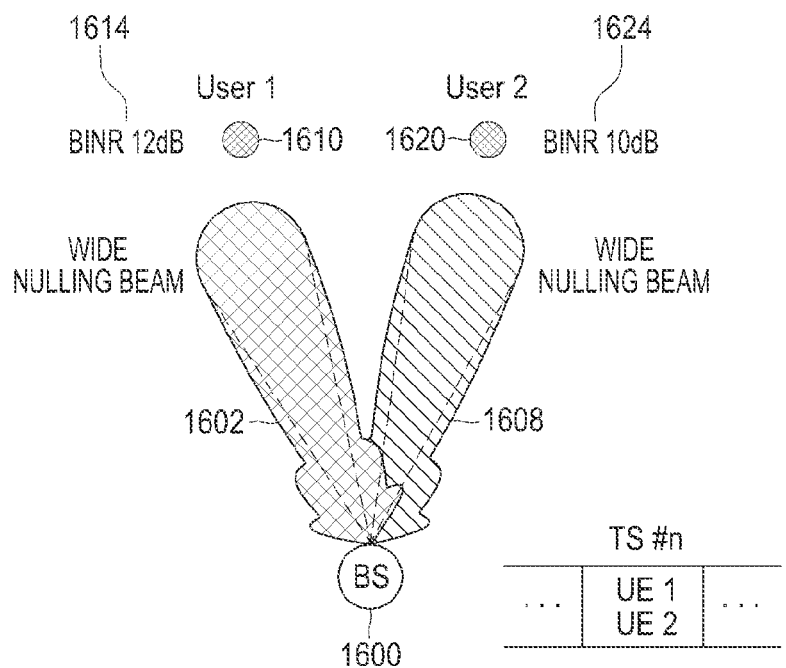

FIGS. 16A and 16B illustrate a ninth scenario of beam setting according to various embodiments of the present disclosure. Here, a case is illustrated in which a QoS required for two users is 10 dB.

Referring to FIG. 16A, a base station 1600 is illustrated, where the base station 1600 applies wide nulling to user 1 (1610) of a user pair (user 1 (1610) and user 2 (1620)) that will be permitted to perform communication for a particular time unit through scheduling, and forms a wide nulling beam 1602 for user 1 (1610). A BINR 1612 of user 1 (1610) predicted for the wide nulling beam 1602 is 9 dB, and a BINR 1622 of user 2 (1620) predicted for primary beam 2 (1604) is 12 dB. Since the wide nulling beam 1602 has the BINR smaller than the QoS reference of 10 dB, the base station 1600 applies wide nulling to primary beam 2 (1604) having a side lobe corresponding to the wide nulling beam 1602 and calculates BINRs for the users 1610 and 1620 again.

Referring to FIG. 16B, a base station 1600 is illustrated, where a new BINR 1614 for a wide nulling beam 1602 of user 1 (1610) is 12 dB, and a BINR 1624 for a wide nulling beam 1608 of user 2 (1620) is 10 dB. Since both of the users 1610 and 1620 have the BINRs 1614 and 1624 greater than the QoS reference of 10 dB, the base station 1600 determines that simultaneous transmission for the two users 1610 and 1620 is possible and determines to simultaneously transmit respective signals for the two users 1610 and 1620 using the wide nulling beams 1602 and 1608 at a time slot #n which is a scheduled time unit.

Figure 17:
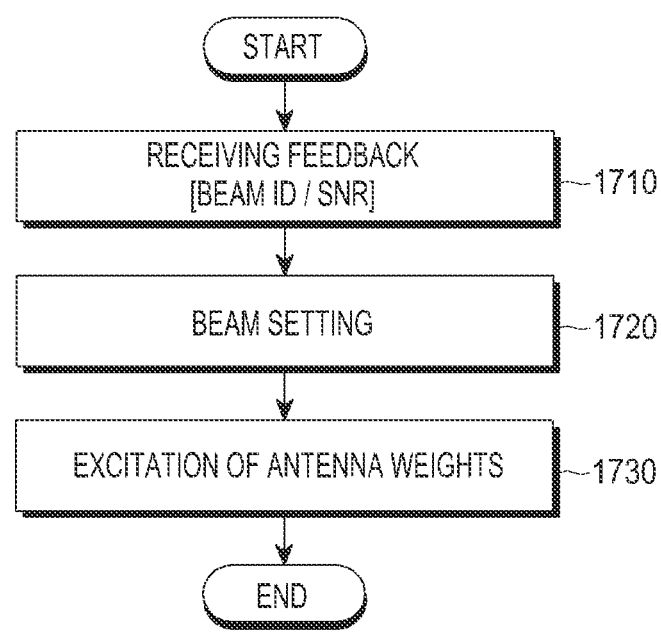
FIG. 17 is a flowchart illustrating an operation of a base station according to an embodiment of the present disclosure.

FIG. 17 is a flowchart illustrating an operation of a base station according to an embodiment of the present disclosure.

Referring to FIG. 17, a flowchart is illustrated, such that in operation 1710, a base station receives feedback including a beam index and an SNR from multiple pieces of user equipment within a cell and schedules some pieces of user equipment to perform communication.

In operation 1720, the base station performs beam setting for the scheduled user equipment. The beam setting may be performed according to one of the above-described scenarios.

In operation 1730, the base station transmits signals for the scheduled user equipment through corresponding beams by applying weights determined through the beam setting.

The following effects can be achieved using one of the various embodiments of the present disclosure operated as described above.

When multiple users are served using a phase array, interference can be effectively controlled.

When it is practically impossible to accurately identify a location of a user, wide nulling can be applied to the vicinity of a main lobe of a beam corresponding to another user, thereby maintaining interference signal power at a lower level.

A small number of controllable attenuators can be added to an existing phase array system operating with the maximum power, thereby achieving excellent extensibility of the system and effective power management.

Due to effective interference control, multiple users can be simultaneously served only with a small loss of power for the same time resources.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A beamforming method for serving multiple users, the beamforming method comprising:
    determining, by a beamforming apparatus, different beams for a plurality of user equipments based on channel information fed back from the plurality of user equipments;
    predicting beam qualities of the determined beams of the plurality of user equipments;
    determining whether the beam qualities satisfy a Quality of Service (QoS) for the plurality of user equipments;
    generating a wide nulling beam by applying wide nulling to a second beam having a side lobe acting as interference against at least one first beam of the beams, when the beam quality of the first beam does not satisfy the QoS;
    predicting beam qualities for the beams including the wide nulling beam instead of the second beam; and
    simultaneously communicating with the plurality of user equipments through the beams including the wide nulling beam instead of the second beam, when the beam qualities for the beams including the wide nulling beam instead of the second beam satisfy the QoS.

2. The beamforming method of claim 1, wherein the wide nulling is performed on a region including a main lobe of the second beam.

3. The beamforming method of claim 1, wherein each of the beam qualities comprises a Beam to Interference and Noise Ratio (BINR) predicted by modeling a corresponding beam as a quasi Line of Sight (LOS) channel.

4. The beamforming method of claim 1,
    wherein the wide nulling is performed by an array antenna, phase shifters, a transceiver, and attenuators,
    wherein the array antenna comprises a plurality of antenna elements,
    wherein the phase shifters are connected to the antenna elements, respectively,
    wherein the transceiver is connected to the phase shifters, and
    wherein the attenuators are placed between the transceiver and the phase shifters corresponding to one or two antenna elements located at opposite edges of the array antenna among the antenna elements.

5. The beamforming method of claim 1, further comprising:
    communicating with the plurality of user equipments through different time slots, when all the beam qualities for the beams including the wide nulling beam instead of the second beam do not satisfy the QoS.

6. The beamforming method of claim 1, further comprising:
applying wide nulling to the first beam, when all the beam qualities for the beams including the wide nulling beam instead of the second beam do not satisfy the QoS;
predicting beam qualities for the beams including wide nulling beams instead of the first and second beams; and
simultaneously communicating with the plurality of user equipments through the beams including the wide nulling beams instead of the first and second beams, when the beam qualities for the beams including the wide nulling beams instead of the first and second beams satisfy the QoS.

7. The beamforming method of claim 6, further comprising:
communicating with the plurality of user equipments through different time slots, when the beam qualities for the beams including the wide nulling beams instead of the first and second beams do not satisfy the QoS.

8. The beamforming method of claim 6,
communicating with the plurality of user equipments through a same time slot, when the beam qualities for the beams including the wide nulling beams instead of the first and second beams satisfy the QoS.

9. A beamforming apparatus for serving multiple users, the beamforming apparatus comprising:
a beamforming unit; and
a controller configured to control the beamforming unit, wherein the controller is further configured to:
determine different beams for a plurality of user equipments based on channel information fed back from the plurality of user equipments;
predict beam qualities of the determined beams of the plurality of user equipments;
determine whether the beam qualities satisfy a Quality of Service (QoS) for the plurality of user equipments;
generate a wide nulling beam by applying wide nulling to a second beam having a side lobe acting as interference against at least one first beam of the beams, when the beam quality of the first beam does not satisfy the QoS;
predict beam qualities for the beams including the wide nulling beam instead of the second beam; and
simultaneously communicate with the plurality of user equipments through the beams including the wide nulling beam instead of the second beam, when the beam qualities for the beams including the wide nulling beam instead of the second beam satisfy the QoS.

10. The beamforming apparatus of claim 9, wherein the wide nulling is performed on a region including a main lobe of the second beam.

11. The beamforming apparatus of claim 9, wherein each of the beam qualities comprises a Beam to Interference and Noise Ratio (BINR) predicted by modeling a corresponding beam as a quasi Line of Sight (LOS) channel.

12. The beamforming apparatus of claim 9, wherein the beamforming unit comprises:
an array antenna comprising a plurality of antenna elements;
phase shifters connected to the antenna elements, respectively;
a transceiver connected to the phase shifters; and
attenuators placed between the transceiver and the phase shifters corresponding to one or two antenna elements located at opposite edges of the array antenna among the antenna elements.

13. The beamforming apparatus of claim 9, wherein the controller is further configured to communicate with the plurality of user equipments through different time slots, when all the beam qualities for the beams including the wide nulling beam instead of the second beam do not satisfy the QoS.

14. The beamforming apparatus of claim 9, wherein the controller is further configured to:
apply wide nulling to the first beam, when all the beam qualities for the beams including the wide nulling beam instead of the second beam do not satisfy the QoS;
predict beam qualities for the beams including wide nulling beams instead of the first and second beams; and
simultaneously communicate with the plurality of user equipments through the beams including the wide nulling beams instead of the first and second beams, when the beam qualities for the beams including the wide nulling beams instead of the first and second beams satisfy the QoS.

15. The beamforming apparatus of claim 14, wherein the controller is further configured to communicate with the plurality of user equipments through different time slots, when the beam qualities for the beams including the wide nulling beams instead of the first and second beams do not satisfy the QoS.

* * * * *